Nov. 7, 1961 E. ESTREMS 3,008,126
RECORD CARD READER
Filed Nov. 5, 1957 5 Sheets-Sheet 1

INVENTOR
E. ESTREMS

BY *James A. Ruth*
AGENT

Nov. 7, 1961 E. ESTREMS 3,008,126
RECORD CARD READER
Filed Nov. 5, 1957 5 Sheets-Sheet 5

United States Patent Office 3,008,126
Patented Nov. 7, 1961

3,008,126
RECORD CARD READER
Eugeni Estrems, Saint Mande, France, assignor to International Business Machines Corporation, New York, N.Y., a corporation of New York
Filed Nov. 5, 1957, Ser. No. 694,638
Claims priority, application France Nov. 17, 1956
4 Claims. (Cl. 340—172.5)

This invention relates generally to perforated record card reading devices and is particularly directed for sensing a pattern of perforations in a record card and to storing said pattern in a magnetic core memory.

According to the invention, data punched in a row of a record card, i.e. the well known IBM card, is sensed row by row by brushes. The pattern of perforations in each row is then read into a temporary intermediate storage device in parallel fashion. It is then read out of this storage device in serial fashion and the pattern of data represented by perforations in the record card is successively recorded bit by bit in a different notation in a main magnetic core memory. At the conclusion of a series of row by row data sensing operations the pattern of perforations representing data recorded in the IBM system of notation has been sensed and transferred into a memory device where the data representations are recorded in a different notation.

A principal object of the invention resides in the provision of means for reading and recording patterns of data representations.

Another object of the invention resides in the provision of intermediate data memory means operative to receive pluralities of data in parallel fashion and to transmit the same therefrom in sequential fashion.

In accordance with the above object and while parallel-series data transformers have been described in the prior art, see for example U.S. Patent No. 2,718,356, issued to W. P. Burrell et al., on September 20, 1955, the novel parallel-series transformer herein disclosed has advantages which are not realizable by the prior art.

Hence, another object of the invention resides in a simplification of circuitry leading to greatly increased reliability.

Another object of the invention resides in the provision of means enabling increased speeds of operation over the Burrell et al. device.

In a particular embodiment of this invention designed to be used with punched cards of the IBM type, the data information is read from the card in twelve separate successive steps, each associated with successive ones of the twelve rows of the card.

In each of these steps, 80 brushes scan the 80 data positions of one row, storing the data representations sensed in an intermediate memory $m$ comprising 80 magnetic cores. These magnetic elements have two stable states, respectively defined by a positive or negative induction. On every one of these 12 steps, these 80 elements correspond to the 80 possible perforable card locations.

Each magnetic memory element is a bistable magnetic core and the invention contemplates the use of a core in the intermediate memory for each of the 80 possible data representing positions in a record card row. The individual magnetic core elements may be enabled or driven from one stable state to another by the use of windings placed thereon for the purpose of recording data by altering the state of induction or for the purpose of developing a signal on a shift of the remanent state, to read stored data from the core. Data, upon being read out of the cores comprising the intermediate memory data, is translated from the original system of notation into another system more adaptable to the use of electronic digital computers, and is then recorded in the main memory unit.

Like the intermediate memory, the main memory comprises a matrix of coordinately arranged bistable magnetic core elements and wherein the pattern of data record card perforations may be reproduced exactly except for notation transformation.

An object of the invention resides in the elimination of matrix scanning systems of the types shown in U.S. Patent No. 2,773,444, issued to G. E. Whitney on December 11, 1956; U.S. Patent No. 2,774,429, issued to E. J. Rabenda on December 18, 1956; or U.S. Patent No. 2,740,949, issued to R. G. Counihan et al. on April 3, 1956, heretofore necessary whenever coordinately arranged matrices of magnetic cores had been used.

Yet another object of the invention resides in the provision of means for reading data represented in a 12-perforation code in converting them into data represented in 4-position code, and in recording them during the time interval between two successive scanning steps, that is during the period taken as two successive rows pass under the brushes, all the data which has been recorded in the main storage unit during the preceding steps may be read out and regenerated therein.

Still another object of the invention resides in the provision of a pair of cascade connected trigger chains, one of which serves as a common system for scanning both the main and intermediate memories, and where the other chain serves to program reading in, reading out, and/or coding functions.

The simplification of circuitry imparts still another object of the invention in that a novel arrangement is provided for using the same trigger chains, amplifiers, current pulse generator wires, etc., for recording and reading data in the main memory.

Other objects of the invention will be pointed out in the following description and claims and illustrated in the accompanying drawings, which disclose, by way of examples, the principle of the invention and the best mode, which has been contemplated, of applying that principle.

In the drawings.

The basic circuits building blocks are represented in the form of symbols in FIG. 2, and are shown in the following drawings.

Before proceeding with a description of the embodiment of the invention the basic circuits comprising the building blocks shown in FIGS. 5A through 10B will be described.

Figure 5A:
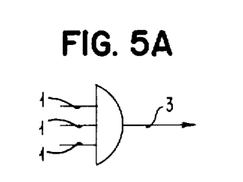
FIGS. 5A and 5B, respectively, represent the block symbol and circuit diagram of a logical OR circuit.
Figure 5B:
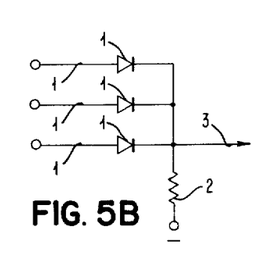

FIG. 5B shows the circuit form of a logical OR circuit, while FIG. 5A illustrates the equivalent block diagram symbol.

It will be assumed throughout the following discussion that zeros and ones of the binary system of notation represent different ones of the two stable states of remanent induction of the magnetic cores used in the embodiment of the invention and are represented, respectively by relatively negative and positive potentials.

The diode OR circuit is shown in FIG. 5B. The diode inputs 1 are connected to a common load resistor 2 which in turn is connected to a series of relatively negative voltages. Each diode will pass current freely in the direction of the "arrow," but present a high impedance to the flow of current in the other direction (in the electronic convention the flow of current is against the arrow). Then when both input lines indicate a zero, the output will also indicate a zero for the reason that the diodes resistance to current flow in this direction is assumed to be negligible when compared to the resistance of the load resistor. Should either one of the input lines be raised in potential so as to indicate a one, the output line will indicate a one, for the reason that an increased amount of current will be caused to flow in the load resistor. Put in another way, the output line 3 will still be connected through a relatively low impedance to the input line with a one signal, and the diode corresponding to the input line with a zero signal will not pass current because the potentials at its terminals will be in the high impedance direction of this particular diode. Therefore, the output will be positive if one input line "OR," the other (or both) is positive.

Figure 6A:
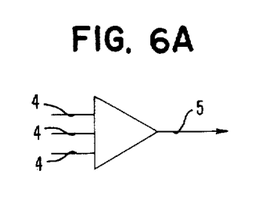
FIGS. 6A and 6B, respectively, represent the block symbol and circuit diagram of a logical AND circuit.
Figure 6B:
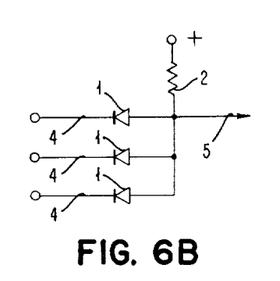

The diode circuit comprising an AND switch is shown in FIG. 6B, while FIG. 6A illustrates the equivalent block diagram convention. The circuit is similar to the OR switch described above, except that the connections to the diodes are inverted and the load resistor is connected to a series of relatively positive potential. If all three of the input lines 4 are held at a relatively negative potential, such as to represent zeros, the ouput line 5 will also be at the same relatively negative potential because the voltage drop from the positive potential source will appear across the resistor. When the potential of one of the input lines 4 is raised to indicate a one, the corresponding diode will have a voltage impressed across it which is in the reverse or high impedance direction, and the potential of the output line 5 will be uneffected. Only when ones appear on all three of the input lines 4 will potential on the output line 5 become relatively positive as is required for a one representation. Put in another way, the output line 5 will become positive only when one input line "AND" all the others also become positive.

Figure 7A:
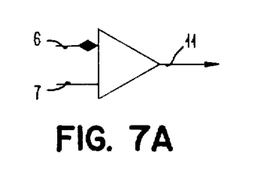
FIGS. 7A and 7B, respectively, represent the block symbol and circuit diagram of a diode gate.
Figure 7B:
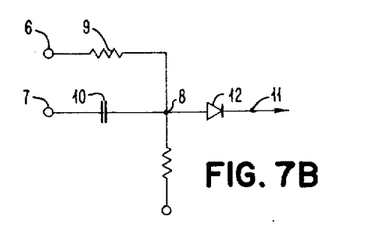

*Diode gate.*—A diode gate, FIG. 7B, comprises two inputs 6 and 7 connected to a common point 8. The first input is connected through a resistor 9 and the second through a capacitor 10. Common point 8 is connected to a common output line 11 of the gate through a diode 12 which is considered to conduct in the input-output direction.

A coincidence circuit such as this form of diode gate represents, serves the purpose of transmitting very short duration positive pulses through the diode. Inputs 6 and 7 are normally negative and positive, respectively. As long as input 6 is negative, pulses appearing at 6 are ineffective for the reason that junction 8 is at a relatively negative potential and diode 12 will not become conductive. On the other hand, when the potential at 6 is raised in level the diode then will conduct. If the parameters of the circuit are properly chosen, then positive pulses applied to input 7 are transmitted through condenser 10 to momentarily additionally increase the potential at 8, whereupon the diode will be rendered conductive.

In practice, the signal produced at the output 11 may be directed, for example, through a capacitor to one of the inputs of a trigger. If the various bias voltages are so adjusted that the peak voltage of the output signal is such as to cause a change of state in the trigger, then it will be seen that the trigger switching requires the following conditions:

(*a*) The advance application of a signal at input 6, and (*b*) The application of a signal to input 7 during the time that the previous signal is applied to input 6, but at some time after the voltage at point 8 has become stabilized at a value close to that of a normally existing voltage at input terminal 7.

The time of switching in this case will correspond to the rise time of the leading edge of the signal applied to input terminal 7.

In the drawings, diode gates are shown in a simplified manner, as per FIG. 7A. The diamond is applied to that input terminal upon which the first or conditioning signal must be applied.

Figure 8A:
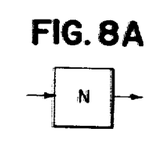
FIGS. 8A and 8B, respectively, represent the block symbol and circuit diagram of a level setting amplifier.
Figure 8B:
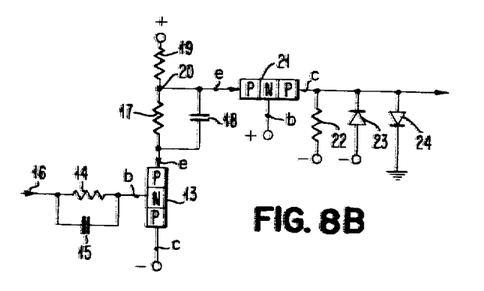

FIG. 8B shows a level setting amplifier circuit, while FIG. 8A shows the equivalent block diagram.

A level setting circuit is used for producing a signal which varies between two specified potential values in response to a received signal varying between two different potential values. The circuit makes use of an emitter follower circuit coupled to an amplifier circuit which feeds a pair of diodes arranged to act as a signal slicer. A level setting circuit of the type shown in FIG. 8B is described and claimed in a co-pending application, Serial No. 459,383, filed on September 30, 1954, by Robert A. Henle, to which reference should be made for a complete description.

A brief description of the level setting amplifier follows:

The emitter follower circuit comprises a PNP junction transistor 13 having an emitter electrode 13e, a base electrode 13b, and a collector electrode 13c. The collector electrode 13c is connected through a biasing battery, not shown, to ground. The base electrode 13b is connected through a resistor 14, having a condenser 15 bridged in parallel therewith, to signal input terminal 16. The emitter electrode 13e is connected to a load circuit which includes in series a resistor 17 paralleled by a condenser 18 and a resistor 19 to a positive source of potential, not shown. The junction 20 between resistors 17 and 19 serves as an output terminal for the emitter follower circuit and as an input terminal for the amplifier circuit. The amplifier circuit includes a PNP junction transistor 21 having an emitter electrode 21e, a base electrode 21b and a collector electrode 21c. The emitter electrode 21e is connected directly to junction 20. Base electrode 21b is connected directly through a positive source of potential to ground, and collector electrode 21c is connected to the signal slicer diode circuit and has connected thereto a load resistor 22, the other end of which is connected to a negative source of potential, not shown. The signal slicer circuit comprises a pair of diodes 23 and 24, the latter connected between the output of the amplifier circuit and ground, while the former is connected directly to a negative source of potential, not shown.

In operation, with no signal present at input 16, the level setting amplifier is provided with an input bias which is relatively negative. The source of potential connected through resistors 17 and 19 to the emitter hold the emitter 13e sufficiently positive with respect to the base 13b so that the transistor 13 is continuously conductive. Resistor 17 has a much lower value than does resistor 19, and the junction 20 is at a relatively negative potential so that the emitter 21e is at a potential below that of the base 21b, and transistor 21 is in a cut-off condition. The potential on collector 21c is then determined by the terminal voltages of the negative sources of supply connected to resistor 22 and to diode 23.

When a positive going signal is impressed upon input 16, this input goes to ground potential. The base 13b and emitter 13e follow, shifting to potentials slightly above ground. The potential of junction 20 is also reached, but is prevented from going much above ground by the clamping action of transistor 21. Transistor 21 starts to conduct thereby increasing the potential drop in resistor 22, and shifting the potential on the output thereof in a positive direction.

Figures 9A, 9B:
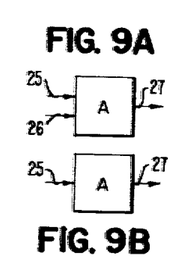
FIGS. 9A and 9C, respectively, represent the block symbol and circuit diagram of a balanced input amplifier.
FIG. 9B symbolically represents a single input amplifier of the type shown in FIG. 9C.
Figure 9C:
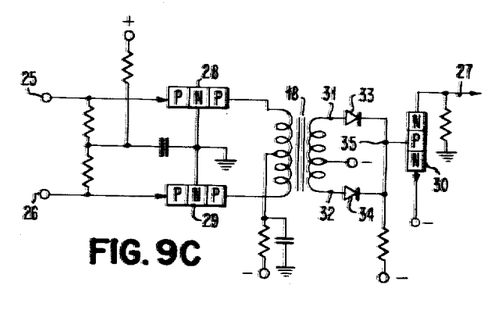

FIGS. 9A, 9B and 9C represent an amplifying circuit used in connection with sensing signals derived from magnetic core memories. FIGS. 9A and 9B are the equivalent block diagrams of the circuit shown in FIG. 9C, and FIG. 9A represents a balanced input amplifier, whereas FIG. 9B represents a single input amplifier.

In sensing magnetic core memories the E.M.F. induced during a magnetic reading is applied across inputs 25 and 26. A positive pulse representative of the input is then produced on the output terminal 27. Referring now to FIG. 9C, the circuit is in the steady state condition. The grounded base transistors 28 and 29 will be operating in the linear region of their characteristics. Under this condition, transistor 30 is biased Off. When a negative impulse is applied to terminal 25 the current in transistor 28 will decrease, while the current in transistor 29 will increase, as these grounded base stages operate as push-pull amplifiers producing on their collectors positive and negative impulses, respectively.

Because of the connection of a transformer in the circuit and the push-pull operation, if a negative impulse is applied to terminal 25 a negative impulse will appear at point 31 and a positive impulse at point 32. However, because of the action of the diodes 33 and 34 only the negative impulses will appear at junction 35. The amplifier circuit of transistor 30 is conventional, and it will suffice to say that the negative pulse input appearing at the base connected to junction 35 will be rendered in an amplified form on terminal 27. In practice, the core sense windings are generally connected between input terminals 25 and 26; however, in certain cases it is desirable to use solely terminal 25 and to ground terminal 26, thereby creating a single amplifier.

Figures 10A, 10B, 10C:
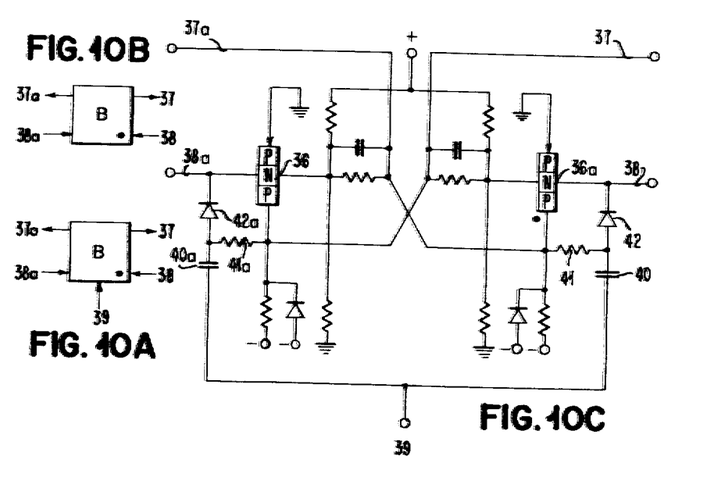
FIGS. 10A and 10C, respectively, represent the block symbol and circuit diagram of a 3-input trigger (one of the inputs being a binary one).
FIG. 10B symbolically represents a 2-input trigger of a modified type shown in FIG. 10C.

FIG. 10C is a circuit diagram of a three-input terminal wherein one of the inputs is a binary input. FIG. 10A is the equivalent block diagram of FIG. 10C, while FIG. 10B represents the same trigger with the exception that the binary input has been omitted. The trigger of FIG. 10C has two stable states of operation and the circuit will be described assuming that the rest condition stable state is represented by conduction through transistor 36. In this case a negative voltage is impressed upon output 37, and a positive voltage upon output terminal 37a. The state of the trigger will be switched by a positive pulse applied to input 38. A positive pulse applied to input 38a has no effect on the circuit. It is desirable that input pulses to a trigger of this type be supplied by AND circuits such as is represented by FIGS. 7A and 7B. The stable state of the trigger may be switched by the application of positive voltage to terminal 39 (the binary input). It will be appreciated that the circuit comprising condenser 40, resistor 41, and diode 42, is effectively the same as the circuit of FIG. 7B.

The other stable state of the trigger corresponds to conduction through transistor 36a. In this case a negative voltage appears on output terminal 37a, whereas there is a positive voltage present at output 37. The state of the trigger will be switched either by a positive pulse applied to line 38a, or by a positive voltage applied to the binary input 39. The normally conducting side of the trigger is indicated by a circular spot placed beneath the collector of the resistor which is conducting, and a signal spot is shown in the lower right-hand corner of the two block diagrams which are equivalent to FIG. 10C.

In a particular embodiment of this invention designed to be used with punched cards of the IBM type, the data information is read from the card in twelve separate steps associated with the twelve rows of the card.

In each of these steps, 80 brushes scan the 80 data positions of one row, storing the data representations sensed in an intermediate memory m comprising 80 magnetic cores. These magnetic elements have two stable states, respectively defined by a positive or negative induction. On every one of these 12 steps, these 80 elements correspond to the 80 possible locations which could be perforated in the row being read.

Each magnetic core bears coils wound up liable to induce a magnetic field that drives it from one magnetic state to the other in order to record the information, or to send a signal when the magnetic core shifts from one state to the other in order to read the information. The latter then is directed into a device that translates the code, then it is recorded in the main storage unit.

The card moves either with lower edge or upper edge ahead, so that successively on every one of these 12 steps, all of the usual 80 columns are read and perforations sensed and recorded in the intermediate memory. However, the following description will be limited in case the card should be scanned initially 9's row first.

One of the main advantages in the working of this new read process through an intermediate memory located between the read brushes and the main storage unit, is that the subject novel device does not require any additional features. As a matter of fact, the magnetic cores of the intermediate memory are characterized by an arrangement with respect to the cores of the main storage unit avoiding the use of additional current pulse generators, as well as additional scanning systems, the pulsing of the cores for reading being ensured serially by pulse generators which also feed the main storage unit, the same chain that serves for scanning the main storage being also used for scanning the intermediate memory.

Data recorded in main storage unit M are read through scanning chains and current pulse generators which, through the adopted arrangement, are the same as those used for reading the data recorded in intermediate memory m. But, whereas memory m must be read out after the scanning of every row of the card, storage unit M could be read out only after the scanning of the last row of the card. The reading out of data recorded in a magnetic core memory can only be performed after deletion. Therefore, in order to use a scanning device common to both memories, the data recorded in M, like those of m, are read after the scanning of every row of the card, and thereafter, they are again recorded in M with data from m in addition. This process is iterated at each row of the card until the last one is over.

Between the scanning of the last row of a card and that of the first row of the next card, data recorded in memory M are read therefrom through the same scanning chains and current pulse generators. Output signals traverse the same wires, same amplifiers, and same triggers as during previous reading. These output signals represent the information contents of the card, and are used for performing calculations or fulfilling any other function, but they are recorded no more in memory M. There are as many outputs as positions of the code used in memory M, and the following description involves 4 output lines.

This device offers an important advantage for it enables one to read data from a card with a very high speed, since, as a matter of fact, the scanning of the 80 positions of one row is performed simultaneously in a single operation by the 80 brushes at the same time. Therefore, it can be said that scanning is performed in parallel. Card scanning is a relatively slow mechanical process which limits the operational speed of accounting machines, and parallel scanning enables one to realize a noticeable gain of time. Those of the 80 brushes corresponding to a perforation of the sensed row switch the corresponding 80 magnetic cores in the intermediate memory which corresponds to them. This recording in an intermediate memory enables increasing the reading speed of the cards, since, through the punched hole, the contact between the read brush and the power roll may be sensed during an extremely short time. Reading from this magnetic memory is serially performed, and since this is an electronic operation that is a faster operation than the previous mechanical scanning, this sequential read out of the 80 ferrites is performed during the time interval within the runs of two successive rows of a card under read brushes. Thus, a parallel mechanical operation combined through an 80-ferrite memory with a serial electronic operation enables this read device to reach an exceptionally high speed.

Another advantage is inherent in this device and in this combination of a parallel function with a serial function. As a matter of fact, parallel mechanical scanning of the card operates more rapidly, that is 80 columns at the same time through 80 read brushes. On the other hand, a single device, common to the 80 columns, performs serial coding, that is bi-column coding, which results in certain economy.

All of the 80 data punched in the card or recorded in the main storage unit may be of any sort, that is, representing 80 numbers, letters, or special signs, or any combinations with each other. It is easy to increase the number of special signs, as for example, +, —, etc. For simplifying purposes, card and memory data in this description are digital data, but it is quite obvious that the invention is not limited to that kind of data.

*Timing pulse generation.*—The generation of pulses which feed so-called read device does not form the object of the invention, and these pulses may be generated according to any principle. Moreover, these pulses may vary with the characteristics of the read device (card, memory, etc.). It is still quite obvious that the example of pulse generation shown in FIG. 2 is only described by way of illustration and can be adapted to any read device in conformity with the invention.

Pulses are generated through a generator G, a start trigger $Bd$, an advance trigger $Ba$, a latch trigger $Bv$, two chains, a start breaker $Rd$, and a reset breaker $Rr$, both of them controlled by cams. One of the two chains, so-called scanning chains, comprises 80 stages of triggers $b1$ to $b80$, enabling the development of 80 successive pulses of $t$ duration. The other chain, called a timing chain, comprises four stages of triggers, and enables the splitting up of every one of the preceding 80 pulses into basic pulses. These four triggers are designated as reset trigger $Bz$, read trigger $Bl$, delay trigger $Br$ and record trigger $Be$. The pulse of $t$ duration then is split up into pulses of $tz$, $tl$, $tr$, $te$ duration meant for the reset, reading, delay and recording operations.

Figure 2:
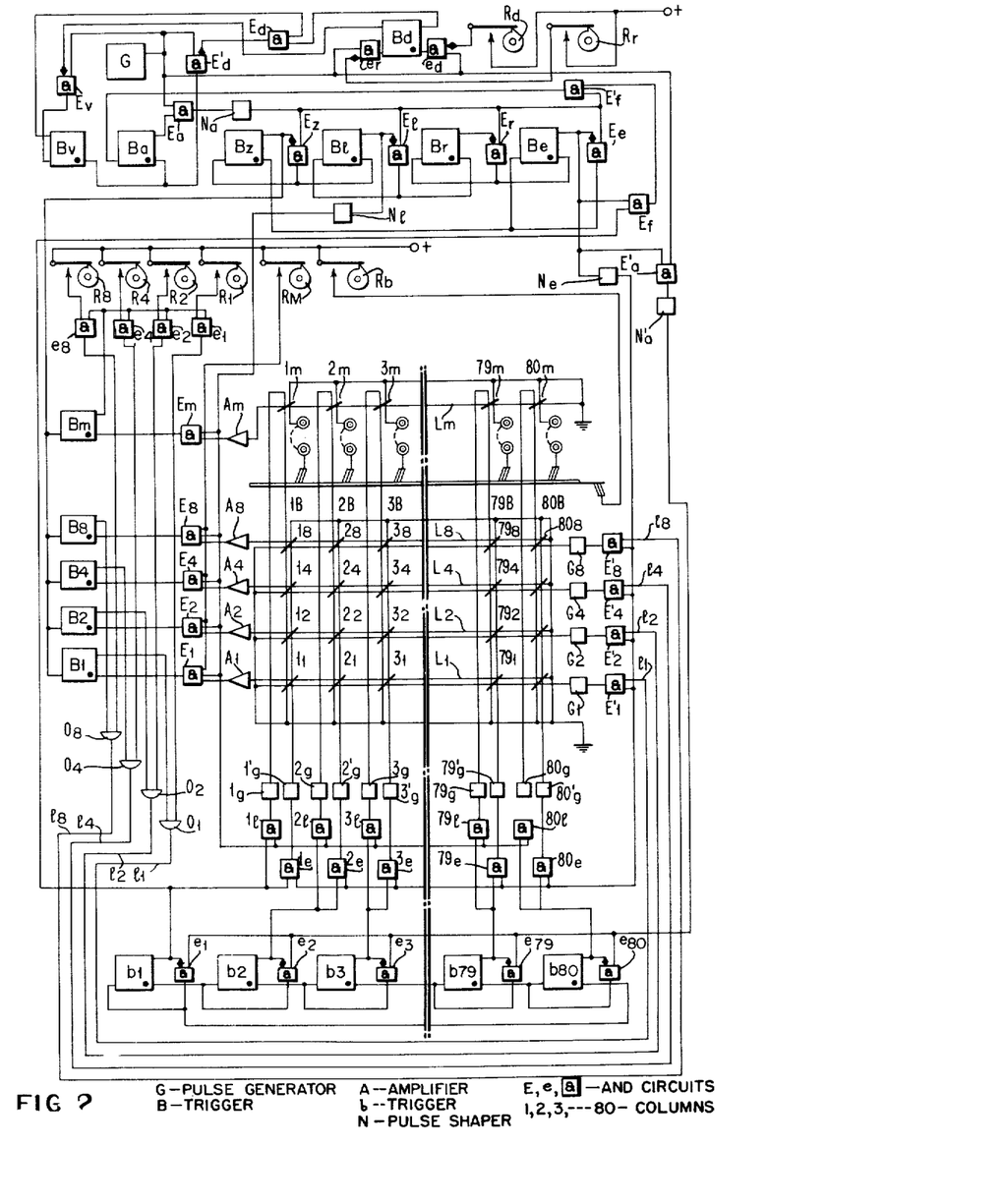
FIG. 2 represents, in the form of logical circuits, the preferred mode of embodiment of the card reading device.

Each trigger, whether constituted by tubes or by transistors presents two stable states designated by the name of "rest condition" or "Off" and "operational condition" or "On." In FIG. 2 triggers are symbolically represented by rectangles with two lower input terminals and two upper output terminals. A signal at right input terminal sets the trigger "On," and corresponding output signal is developed at right upper terminal. Likewise, left terminals correspond to the "Off" condition of the trigger. In both chains one single stage is "On" and all others are "Off." Under action of advance pulses the chains proceed stage by stage, that is the trigger being "On" is directed to "Off" and the next trigger to "On" condition. The scanning chain moves from the right to the left, that is from $b$-80 to $b$-1 while the timing chain moves from the left to the right, that is from $Bz$ to $Be$. These chains, for example, may be of the type described in U.S. application Serial No. 643,369, filed on March 1, 1957, by Eugeni Estrems and Maurice Papo.

Figure 3:
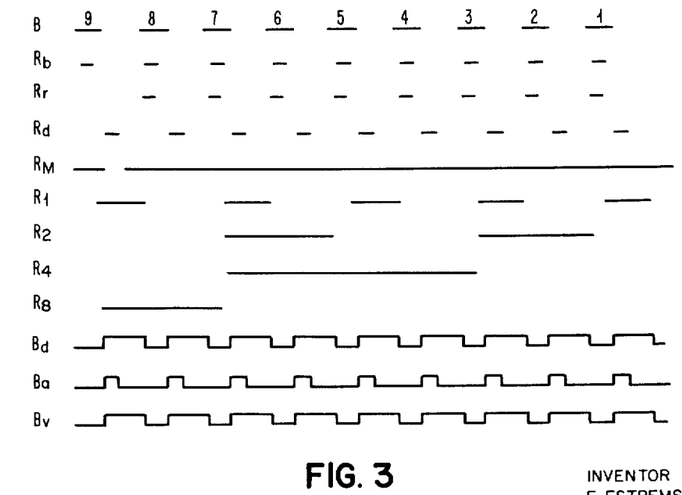
FIG. 3 is a timing diagram.

The reading of a card is performed in 12 scanning cycles corresponding to the 12 rows of the card. Character B in FIG. 3, represents these cycles beginning at the initial end of a line and ending at the beginning of the next line. Each cycle comprises so-called scanning time and the time interval within the scanning of two successive rows, that is, the time represented by a line during which a punched hole passes the read brushes, and that during which it is the interval between two successive rows of perforations that pass the brushes, represented by the distance separating two lines. At the beginning of every scanning cycle, all of the triggers are at rest, except reset trigger $Bz$ and the first trigger of scanning chain $b$-80 (refer to characteristic curves $Bz$ and $b80$ in FIG. 4). The initial state of the triggers is indicated in FIG. 2 by a point in the lower right corner of the rectangle which symbolizes triggers in "Off" condition, or a point in the left one for triggers in "On" condition.

Generator G may be constituted by a multivibrator. It generates square pulses of F frequency represented by curve G in FIG. 4.

Figure 4:
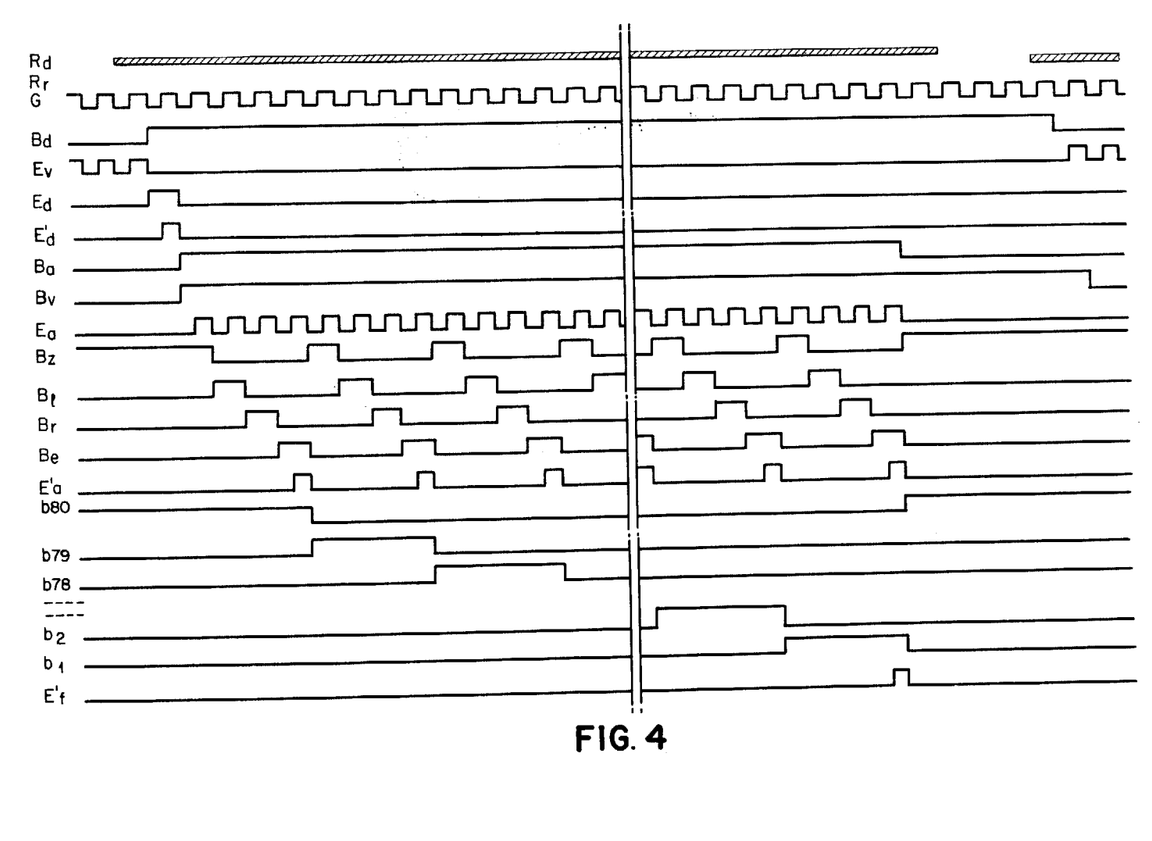
FIG. 4 shows the timing diagram illustrating the operation of scanning the timing chains.

The closing time of start breaker $Rd$ is given by curves $Rd$ in FIGS. 3 and 4. When actuated by its cam, start trigger $Rd$ makes. It enables the application of a positive voltage to an input terminal of logical AND circuit $ed$. This $ed$ circuit is a 2-input terminal gate, a slow one connected to the high voltage supply through breaker $Rd$, and a rapid one which receives the signal from generator G. The simultaneous signals at both inputs initiate an output signal at a time in coincidence with the trailing edge of the short signal. The output signal of $ed$ is applied to the right input terminal of start trigger $Bd$ which is operated (refer to curve $Bd$ in FIG. 4). Output voltage at right terminal of $Bd$ and that of left terminal of trigger $Bv$, which is "Off," are applied to the two input terminals of logical AND circuit $Ed$. The output voltage of the latter lasts during the time when simultaneously $Bd$ is "On" and $Bv$ is "Off," and it is represented on curve $Ed$ in FIG. 4. Coincidence between this pulse $Ed$ and that from generator G is defined through logical AND circuit $E'd$. The signal at output $E'd$ will have the shape of curve $E'd$ in FIG. 4. This signal is directed to right input terminals of advance trigger $Ba$ and latch trigger $Bv$, which come to "On" at a time which coincides with the trailing edge of this signal (refer to curves $Ba$ and $Bv$ in FIG. 4).

Simultaneously with the operation of trigger $Bd$, pulses represented on curve $Ev$ in FIG. 4 cease, which were used to drive $Bv$ to "Off" condition. As a matter of fact, these pulses could only exist as long as trigger $Bd$ was "Off," being produced at the output of logical AND circuit $Ev$ by the simultaneous development of pulses by G and of signal at the left output of $Bd$.

In conclusion, triggers $Ba$ and $Bv$ go "On." $Ba$ is used for the progression of the timing and scanning chains, as this will be seen in detail later on. $Bv$ enables the setting up of one single scanning of the timing chain and to avoid a second scanning as long as breaker $Rd$ is closed.

As long as trigger $Ba$ operates, pulses developed by G appear at the output of logical AND circuit $Ea$. These pulses, shown on curve $Ea$ in FIG. 4, enable both chains to progress. They are applied through a circuit $Na$, this circuit being such that the pulse at the output of $Na$ may reach the required level. For a better understanding of the operation of these chains, it should be advisable to refer to the aforesaid patent application.

At the start of the scanning cycle in the timing chain, trigger $Bz$ was operating and also trigger $b$-80 in the scanning chain (refer to curves $Bz$ and $b$-80 in FIG. 4). The voltage collected at the output of $Bz$ is applied to the left input of triggers $Bm$, $B8$, $B4$, $B2$ and $B1$ in order to reset them to "Off."

At the output of circuit $Na$, the advance pulse represented on curve $Ea$ in FIG. 4, which coincides with the operational condition of $Bz$, traverses AND circuit $Ez$, drives trigger $Bl$ to "On," and resets trigger $Bz$ to "Off." The timing chain advances by one stage. The pulse at the output of read trigger $Bl$, represented on curve $Bl$ (FIG. 4) is applied to a circuit N$l$, enabling the pulse to reach the required level, and then logical AND circuits E$m$, E8, E4, E2, 1–1 to 79–1 and 80–1 to do so. This serves to define a read time $tl$ in the memories.

Advance pulse E$a$, which coincides with the "On" condition of B$l$, traverses AND circuit E1, drives B$r$ to "On," and resets B$l$ to "Off." The timing chain progresses by one stage. The pulse at the output of B$r$, represented on curve B$r$ (FIG. 4) forms a delay time $tr$ between the read time and the recording time.

Advance pulse E$a$, which coincides with the "On" condition of B$r$ traverses AND circuit E$r$, drives B$e$ to "On" and resets B$r$ to "Off." The timing chain progresses by one stage. The pulse at the output of B$e$, shown by curve B$e$ in FIG. 4, is applied to a circuit N$e$, enabling that pulse to reach the required level, then to logical circuits E'8, E'4, E'2, E'1, 1$e$ to 80$e$. This pulse is useful for determining time $te$ meant for recording in the memories.

Advance pulse E$a$, which coincides with the "On" condition of B$e$ traverses AND circuit E$e$. At the output of E$e$, it drives B$z$ to "On" and resets B$e$ to "Off." The timing chain initiates a new progression from B$z$. The pulse from generator G, which coincides with the "On" condition of B$e$, traverses logical AND circuit E'$a$. At the output of the latter, the pulse is applied to a circuit N'$a$ which enables it to reach the required level, then to AND circuits $e$1 to $e$80. This pulse is shown on curve E'$a$ in FIG. 4, and is meant for advancing the scanning chain. As a matter of fact, it traverses AND circuit $e$80 because trigger $b$–80 is driven to "On," then drives trigger $b$–79 to "On" and resets trigger $b$–80 to "Off" (refer to curves $b$–80 and $b$–79 in FIG. 4). Therefore, the scanning chain progresses by one stage to the left, every time the timing chain is entirely traversed. While trigger $b$–79 is "On," the timing chain again enables the development of basic pulses of duration $tz$, $tl$, $tr$, and $te$, as this has been seen previously, for reset, delay and recording in column 79. When the timing chain again has been entirely traversed, its last pulse drives trigger $b$–78 to "On" and resets $b$–79 to "Off," and so on. The scanning chain progresses by one stage every time the timing chain has been entirely traversed. Assuming that $t$ is the time interval between two advance pulses of the scanning chain, that is the time during which each trigger $b$–80 to $b$–1 is "On." To every one of these 80 triggers, as to every one of these times $t$, corresponds one column of the card and of the memories. These times are divided into basic pulses $tz$, $tl$, $tr$, $te$, respectively, meant for resetting the "Off" condition triggers B$m$, B8, B4, B2, B1, for reading the data recorded in the corresponding column of memories $m$ and M, for determining a certain delay and for the recording in this column. Assuming the scanning chain is entirely traversed, trigger $b$–2 in turn is driven to "Off" condition, and trigger $b$–1 to "On" (refer to curves $b$–2 and $b$–1 in FIG. 4). The operation time $t$ of $b$–1 also is divided into $tz$, $tl$, $tr$, $te$, assigned to column 1. When both chains have been traversed completely, B$e$ and $b$1 are "On." The output voltage from B$e$ will be directed into logical AND circuit E$f$, and at the output of AND circuit E'$f$, as shown by curve E'$f$ in FIG. 4, resets advance trigger B$a$ to "Off" condition (refer to curve B$a$ in FIG. 4). Moreover, advance pulse E$a$ and the pulse generated by G, which coincides with the "On" condition of B$e$, respectively, traverse AND circuits E$e$ and E'$a$. At the output of E$e$, they reset B$e$ to "Off" and drive B$z$ to "On." At the output of E'$a$, they are applied to circuit N$a$. Then at logical AND circuit $e$–1 they traverse since $b$–1 is "On" (refer to curve E'$a$ in FIG. 4), and then they reset trigger $b$–1 to "Off," and drive trigger $b$–80 to "On."

When B$a$ is "Off," there are no more advance pulses (curve E$a$ in FIG. 4). Both chains stop, while coming back to the initial state where they had come from. In other words, all the triggers are "Off" except B$z$ and $b$–80 which are "On."

When reset breaker R$r$ closes its contact (refer to curve R$r$ in FIGS. 3 and 4) it enables the application of a positive pulse to the slow input of logical AND circuit $er$ to favor it. The first pulse from generator G, which coincides with the make of contact R$r$, provides a signal at the output of circuit $er$, and this signal is applied to the left input terminal of B$d$ which goes to "Off" (refer to curve B$d$ in FIG. 4). The voltage at the left output of B$d$ is applied to logical AND circuit E$v$, enabling pulses generated by G to develop at the output of E$v$. These pulses are shown by curve E$v$ in FIG. 4. They drive trigger B$v$ to "Off" condition (refer to curve B$v$ in FIG. 4), and triggers B$d$, B$v$, B$a$ return to "Off" condition. Timing and scanning chains are traversed completely, and the scanning cycle of the next row is prepared to start.

It is obvious that a timing chain comprising five or a greater number of triggers could enable division of every one of the 80 scanning pulses into five basic pulses or more to be used for other functions in addition to the four above-mentioned functions. For example, a fifth pulse could figure an idle time between the recording time and the reset time, in order to prevent two consecutive scanning cycles from overlapping.

Figure 1:
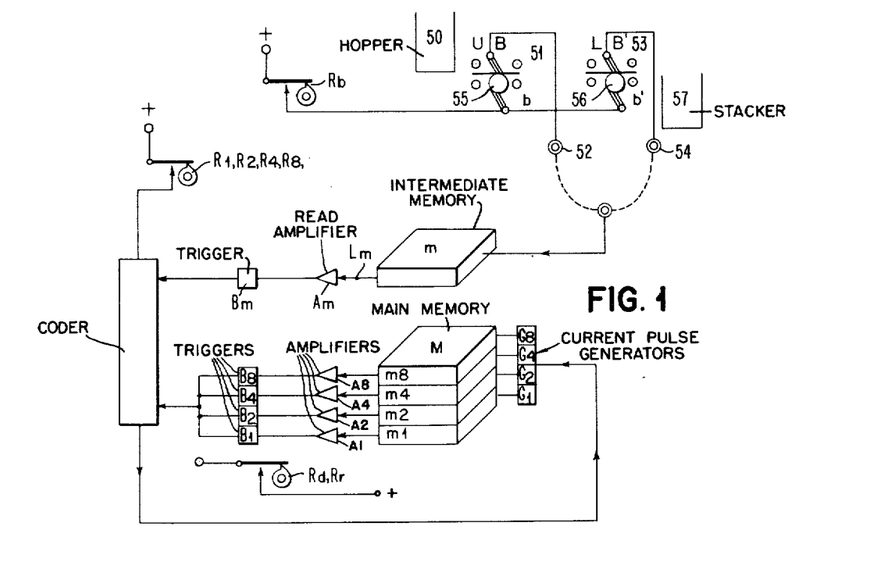
FIG. 1 represents, in the form of a functional diagram, the various component elements of the card reading device.

*General description.*—A simplified block diagram disclosing the general nature of the invention is shown in FIG. 1.

A perforated record card transport and reading device is shown schematically in the upper portion of the figure. The particular form of construction used does not form a part of the invention, and for reference purposes a complete description of the mechanically operated card transport is given in Reissue Patent 21,133, originally issued on March 3, 1936, to C. D. Lake.

Cards to be read are placed in a hopper 50 from whence they are fed to a brush reading station 51, comprising 80 upper brushes UB, one for each column of data information on the IBM card. Each brush UB is connected to an individual plughub 52.

After passing through reading station 51, the cards are sensed again in reading station 53, also as in the case of 51, provided with 80 brushes LB, and where each brush LB is also connected to a plughub 54. Brushes UB and LB are connected via the contact rolls 55, 56 to a source of current which is periodically interrupted by circuit breaker R$b$, the timing of which is indicated by line R$b$ in FIG. 3, and which is synchronous with the progression of perforable locations in each of the record cards passed under the brushes from card hopper 50 to card stacker 57. The 80 laterally spaced brushes simultaneously scan each of 80 perforable positions in each of the twelve rows of a record card.

As each row of 80 perforable positions in each card is scanned, any information sensed is read out via plughubs 52, 54 to an intermediate memory.

The read device shown in FIG. 1 is provided with a main memory M and an intermediate memory $m$. All these memories may be of any type. In this description, it is assumed that they are constituted by toroid magnetic cores that can have two stable magnetic states, respectively, characterized by a negative or positive remanent induction, and enabling them to record binary information. Basic value 0, arbitrarily chosen, corresponds to one magnetic saturation state, and basic value 1 to the other stable state. The application of a magnetomotive force +2H causes the core to pass from state 0 to state 1, so as to record information therein, and a magnetomotive force −2H resets it to state 0, developing a read pulse whereas a force ±H does not change the state of the core.

Memories $m$ and M, respectively, comprise 80 and 320 magnetic cores which may be arranged in any desired manner. For reasons of economy of current pulse generators, triggers in the scanning chain, or switches, the best arrangement is that of an equal dimension array. In the example shown in FIG. 1, $m$ and $M$ are represented in perspective. The first one is a two-dimensional 8 x 10 array, and the second is a superposition of 4 two-dimensional 8 x 10 arrays.

These four arrays are designated by: $m1$, $m2$, $m4$, and $m8$. In FIG. 2, in order to make the description simpler and easier to understand, it is assumed that the 80 magnetic core arrays are arranged in rows. Therefore, memory $m$ is represented by a row of 80 ferrites designated by $1m$ to $80m$, and memory M is represented by 4 rows 1, 2, 4, 8 of 80 ferrites designated by 1–1 to 80–1, 1–2 to 80–2, 1–4 to 80–4, and 1–8 to 80–8, the digit representing the column and the index indicating the row.

In FIG. 2, memory M has been represented only by columns 1, 2, 3, 79 and 80 so as to avoid useless iteration, columns from 4 to 78 being similar to the others.

The cores of memory M are traversed by 4 windings, two for recordings and two for reading. Those of memory $m$ are traversed by 3 windings, a single one being sufficient for recording, and two for reading. A winding may be constituted by any number of turns. It has been represented as a single line in order not to complicate FIG. 2.

For the recording in M, the 80 windings associated with the 80 cores arranged in the same row are serially connected. Through rows 1 they receive the recording signals from the coder and develop a recording field H in the line or lines defined by the coder. Moreover, the 4 windings associated with the 4 cores of M arranged in the same column are serially connected. During the time $te$ meant for the recording they receive pulses from the scanning chain and successively develop magnetic fields H in every column. In M, recording, that is the shift of a core from saturation state 0 to state 1, is effected by the combination of both fields, at the crossing of the line defined by the coder and of the column defined by the scanning chain.

In memory $m$ both recording windings are replaced by a single one which may be connected directly to the associated read brush so as to develop a magnetomotive force 2H when a perforation has been sensed.

For reading, the 5 windings associated with the 5 cores of a given column (the four cores of M and those of $m$) are serially connected. During time $t–l$ meant for reading, they receive pulses from the scanning chain and successively develop in each column magnetomotive forces —2H which reset to saturation state 0 the cores which were in state 1, thus developing reading pulses in read line or lines 1 that serially traverse the 80 cores of one row.

The one, two or three-dimensional ferrite arrays show enough that it is quite possible to arrange the ferrites according to several other modes of any sort. In the case where the memory is constituted by a 3-dimensional array, magnetization of the ferrites may be performed according to the processes described in U.S. Patents Nos. 2,740,949 and 2,739,300, filed on August 25, 1953. According to these patents, around the magnetic cores, several windings develop magnetic fields +H or inhibition fields —H, insufficient to cause a saturation state shift in the core. But the presence of two magnetic fields +H and simultaneous absence of an inhibition field —H, enable the development of a field +2H sufficient to shift the saturation state of the core.

In the arrangement in rows of the memories (FIG. 4), the energization of the cores is simplified, since the pulses of the inhibition current are useless.

It is obvious that, for reading other cards as, for example, 160-column cards, a 160-core memory is necessary, but description is limited to data recording in a 80-column card. Likewise, main memory M shall be provided with a larger size inasmuch as it is asked to record more data.

During the first read cycle of the card, the row of the 9's is scanned by set B of 80 brushes, one brush being assigned to every one of the 80 columns of the card. The information is read out in parallel, that is simultaneously, from the 80 positions of the row of the 9's in the card. Contact is set up between one brush B and power roll 2 only if a perforation exists. In these brushes, current flows only during the closing time of breaker R$b$ (curve R$b$ in FIG. 3). This current can exist only during an extremely short time, noticeably lower than the time during which the perforation runs under the brush (curve B in FIG. 3), and just required for the energization of a magnetic core. All the brushes corresponding to a perforation in this row of 9's are traversed by a current which flows directly through the associated recording windings of the cores in intermediate memory $m$. These windings develop a field 2H which changes the magnetized state of the core. Thus data contained in a row of the card is automatically recorded in parallel in $m$, directly from the read brushes.

Initially, all the cores in $m$ were in magnetic state 0, so that after the scanning of the first read cycle the 80 cores of $m$ form the "image" of the row of the 9's in the card. The term "image" means that the presence of a perforation corresponds to saturation state 1 of the magnetic core and the absence of perforation corresponds to the other saturation state, that is 0. When this cycle is over, the data of line 9 in the card has been transferred to memory $m$.

The time interval that separates this scanning cycle of the row of the 9's from the beginning of the next cycle, that is reading of the row of the 8's, is used for performing the serial transfer from the intermediate memory into the main one, and the reset of the cores in the intermediate memory.

The transfer is associated with a code shifting and forms the detailed subject of further paragraph entitled "Code and Coder." The reset of cores in $m$ which have changed their state, that is the return of the cores to magnetic state 0, if effected automatically when they are serially scanned to be read. In the case where memory $m$ is arranged in a single row of 80 mganetic cores, reading is performed through the combination of the scanning and timing chains previously described. The same chains will serve for recording and reading in memory M. One state of the scanning chain is provided for corresponding to each column of the card or of the memory. Between two scanning cycles of the card, curve B in FIG. 3, the start breaker R$d$ closes its contact (refer to curve R$d$, FIG. 3), the 80 stages of the scanning chain are successively driven to "On" condition (refer to curves $b1$ to $b80$, in FIG. 4). The 80 outputs of triggers $b1$ to $b80$ of this chain are connected to one input of the 80 logical AND circuits 1–1 to 80–1. The output pulses of trigger B1 are applied to the other input of these AND circuits, so that successively at every AND circuit, there will be coincidence between both input pulses and successively will develop, at the output of every one of the 80 AND circuits, pulses which will control current pulse generators $1g$ to $80g$. These current pulse generators, as also generators $1'g$ to $80'g$, G1, G2, G4, G8 further mentioned in this description are represented in FIG. 2 by a rectangle with one input and one output. A signal at the input of one of these generators enables the development at the output of a current pulse which traverses the windings of the ferrite cores. These generators may be built as that described in U.S. application Serial No. 646,892, filed on March 18, 1957, by Auguste F. Mestre. Generators $1g$ to $80g$ successively generate currents that traverse the 5 read windings (of $m$ and M) in the 80 columns developing magnetic fields —2H. Should a magnetic core in memory $m$ have saturation state 0, the read current traversing this winding will not change its state. Should that core have saturation state 1, it will come back to state 0 developing a pulse in line L$m$ which runs through the 80 cores of $m$.

The presence of one perforation in a given column will find expression then, during the operation of the scanning trigger associated with this column, in a pulse in read line L*m*, whereas the absence of perforation will find expression in a lack of pulses. These pulses from the read out of memory *m* are applied through line L*m* to the input of a read amplifier A*m* and then traverse logical AND circuit E*m*, since it is favored by the output pulse from trigger B1, and are applied to the input of a trigger B*m* which enables keeping the information during time longer than that directly available at the output of a ferrite core. The use of the information read from the core is not made directly from the read brushes, but from output signals in trigger B*m*. This characteristic always renders this signals measured and independent of the possible bouncing of the brushes. At the output of this trigger, the signal is applied to the coder and then to the memory M.

Assume that the card to be scanned shows a perforation in row 9, column 79, for example. After the scanning of the card, core 79*m* is in saturation 1. The period during which trigger *b*–79 comes to "On" comprises in order: a time for resetting the triggers, a read time *tl* during which generator 79*g* develops a current pulse which traverses the read winding of core 79*m* generating a magnetic field —2H. Therefore, a read signal is applied through L*m*, A*m*, E*m*, B*m*, to the coder. This pulse resets core 79*m* to saturation state 0. At the output of the coder, the signal favors logical AND circuits E'8 and E'1, through lines 1–8 and 1–1, because the coder translates the perforations of row 9 into 8+1 (refer to paragraph "Code and Coder," and time diagram of the cams in the coder). Still during the operational time of trigger *b*–79, the read time of column 79 in memory *m* is followed by a recording time in column 79 of memory M. During this period, that is during the operational time of trigger B*e*, generators G8 and G1 develop a magnetic field H in the recording windings of the 80 cores in rows 8 and 1 of memory M, since E'8 and E'1 have been favored by the coder. Simultaneously, another magnetic field H is developed in the H recording windings of column 79. This field due to current pulse generator 79'*g*, is developed during the coincidence of two pulses at the input of logical AND circuit 79*e*, the one from trigger *b*–79 of the scanning chain, and the other from recording trigger B*e*. The coincidence between both these fields H determines in M the core saturation state shift at the crossing of rows 8 and 1 with column 79 where perforation 9 has been sensed. Recording in M shall be performed in the same way for all the columns where a perforation 9 has been punched.

At the end of the read cycle, in the row of the 9's in the columns of M associated with the columns where perforations 9 have been sensed, cores 8 and 1 have changed their saturation state. The second read cycle starts where the row of the 8's in the card to be scanned passes under the set of brushes B.

Trigger B*m* is reset to 0 at each time *tz*, that is at the beginning of every one of the 80 scanning cycles, and is again reset to 0 when *b*–80 is started. One by one, cores in intermediate memory *m* are reset to saturation state 0 during read time *tl* of the associated column, and, finally, the last core in *m*, that corresponding to column 1, is reset during the operation of trigger *b*1, so that all the cores in *m* and all the triggers come back to the initial state and the same process starts again for the row of the 8's exactly as before in the row of the 9's. First of all, brush set B senses perforations in the row of the 8's. Those of the 80 magnetic cores in memory *m*, corresponding to perforations, change their saturation state and then the image of the row of the 8's is reproduced in memory *m*. Scanning chain *b*1 to *b*80 starts from *b*80. Successively the trigger in each column goes "On" during time *t*, initiating first a reset pulse in triggers B*m*, B8, B4, B2, B1, then a pulse (magnetic field —2H) meant for the read out of the 5 cores (M and *m*) of one column, and finally a pulse meant for recording (magnetic field +H) in memory M. As to the cores in saturation state 1, the pulse meant for reading develops a signal in associated read lines L*m*, L8, L4, L2 or L1. This signal traverses read amplifiers A*m*, A8, A4, A2 or A1, AND circuits E*m*, E8, E4, E2 or E1, and triggers B*m*, B8, B4, B2 or B1, so as to energize the input of the coder. Column by column, reading in *m* is performed simultaneously with reading in M and is associated with the deletion of data recorded therein. In other words, all the cores in *m* and M are reset. The coder receives the electronic signals due to the existence of perforations in row 8 of the card (reading of *m*), those due to perforations sensed at the preceding cycle in the row of the 9's (reading of M), and mechanical data indicating the row which was being scanned, in this case the row of 8's. The combination of this data enables the changing of the state of the ferrites at the crossing of row 8 with columns where perforations have been sensed, and at the crossing of rows 8 and 1 with columns where perforations have been sensed during the preceding cycle. Reading in memory *m* coincides with that of M, so that, at every cycle, information which was recorded in memory M is read again, passes again through the coder and again is regenerated in M. The transfer from *m* to M is performed as in the row of the 9's. It is associated with regeneration in M of the data recorded therein.

At the completion of the cycle of the 8's, M contains the data recorded in rows 8 and 9 of the card. At the next cycle, it is row 7 which is scanned and recorded in memory *m*. During the run past read brushes of the interval between row 7 and row 6, M is again read out at the same time as *m* and all the data contained in rows 7, 8 and 9 is recorded in M. The rows of the 6's, 5's, etc., are scanned and their data recorded in M at the same time as data which had been recorded during the preceding cycles are regenerated in M. At the end of the last read cycle, M contains all the data which has been punched in the card. This result has been obtained because every one of the 12 read cycles comprises a scanning time for the perforations punched in one row, and then 80 scanning cycles associated with the 80 columns. Every scanning cycle comprises a read time and a recording time, omitting reset or delay times. During reading operation, the pulse applied to the five read windings (in *m* and M) of the column corresponding to the operated scanning trigger, develops a magnetic field —2H therein. During recording operation, the pulse is applied only to the 4 recording windings of M in the same column, and develops a magnetic field +H. The read pulse of one column is followed by the recording pulse in the same column, and then by the read pulse of the next column, etc. Thus, the same chain of triggers enables the simultaneous scanning of the main memory M and intermediate memory *m*.

In one row of the card, the existence of perforations in various columns, simultaneously scanned and recorded in *m*, is translated at the reading of *m* into pulses liable to be generated successively in read line L*m* or at the output of trigger B*m*. These pulses are lagged in time with respect to each other since they are synchronized by the scanning of the chain which constitutes a mark to discriminate them when they are recorded in M. Therefore, they are developed serially, thus providing the important advantage of enabling a single device common to the 80 columns to perform the coding operation for all the 80 columns. That is the function of the coder.

In the case (FIG. 1) where memory *m* is constituted by a two-dimensional 8 x 10 array, the scanning chain must be replaced by two scanning chains synchronized with each other, one with 8 stages for the tens from 0 to 7, and one with 10 stages for the units from 1 to 10, but principles of reading, recording, scanning chain progression, and pulse generation, remain the same as in the preceding case. However, this arrangement provides a noticeable economy since the chain of the 80 triggers may be replaced by two chains comprising at total of 18 triggers. The same economy is also found in current pulse generators: 18 instead of 80.

*Code and coder.*—The codes are described by way of illustration. They should be considered as one example, and may be generalized for any other type. Data to be read may be introduced in the apparatus, through conventional record cards. The card comprises 80 columns of 12 rows, and according to the location of perforations punched in the card 80 characters may be recorded therein. The ten lower rows are assigned to digits 9 to 10 and the 3 upper rows to 0, 11, 12, which serve for determining letters, special characters, algebraic signs, etc., through their combination with other digital perforations. This coding system may be extended so as to represent signs +, =, ?, ), ", or currencies such as francs, pound sterlings, etc.

The code used in the memory is an H-signal code which signals are designated 1, 2, 4, 8 and serve for representing binary digits. Thus 1 corresponds to 1; 2 to 2; 3 to 2+1; 4 to 4; 5 to 4+1; 6 to 4+2; 7 to 4+2+1; 8 to 8; and 9 to 8+1.

The translation of the code used in the card into this 4-signal code is performed in the coder. A digital perforation represented in decimal system is translated into its binary equivalent, e.g. 7=1+2+4. The output of trigger B$m$ is connected to input of the coder. This connection enables the application to the coder of electronic signals from the reading in intermediate memory $m$ indicating the existence of perforations in the row being scanned in the card.

Moreover, through triggers B1, B2, B4 and B8, the coder receives electronic signals from the reading in memory M indicating the perforations sensed in rows previously scanned in the card.

Also, the coder receives mechanical information indicating the row to be scanned. In FIG. 3, this information, timed with the mechanical rate of card scanning, is introduced by breakers controlled by cams R1, R2, R4, R8. It is obvious that these cam breakers may be replaced by electronic circuits synchronized with card progression. Knowing code conversion, it is easy to foresee when breakers must make. The following table represents a cam timing diagram (refer to curves R1, R2, R4, R8 in FIG. 3), and indicates as a function of the row being scanned, the breaker contacts closed.

| During scanning in following rows | Closed Contacts | All Others |
|---|---|---|
| 9 | R8 and R1 | Open. |
| 8 | R8 | Do. |
| 7 | R4, R2 and R1 | Do. |
| 6 | R4, R2 | Do. |
| 5 | R4, R1 | Do. |
| 4 | R4 | Do. |
| 3 | R2, R1 | Do. |
| 2 | R2 | Do. |
| 1 | R1 | Do. |

In addition to these breakers, the coder is constituted by 4 logical AND circuits: 1-1, 1-2, 1-4, 1-8, and 4 logical OR circuits: O1, O2, O4, O8, the output of which are connected to four lines 11, 12, 14, 18, meant for connecting the coder to the recording circuits in memory M.

The mobile part of 4 breakers R1, R2, R4, R8 is connected to a voltage source designated +. When the contact of a breaker makes, it enables the application of this positive voltage to an input of the associated logical AND circuit 1-1, 1-2, 1-4, 1-8, in order to favor it.

Signals from the reading in intermediate memory $m$, meant to be recorded in M, are applied through line L$m$, to amplifier A$m$, to AND circuit E$m$ (favored by B$l$ during read time) and to trigger B$m$. The output voltage of trigger B$m$ is applied to the other input of the four AND circuits $e$-1, $e$-2, $e$-4, $e$-8.

The information corresponding to perforations previously scanned, and recorded in M, is meant for regeneration therein. It is read again at each scanning cycle, simultaneously with reading in $m$. The read signals from M are applied through lines L1, L2, L4, L8 to amplifiers A1, A2, A4, A8, to AND circuits E1, E2, E4, E8 (favored by B$l$ during read time), and to triggers B1, B2, B4, B8.

The output voltages of AND circuits $e$1, $e$2, $e$4, $e$8, and those of triggers B1, B2, B4, B8 are applied to both inputs of logical OR circuits O1, O2, O4, O8. These OR circuits enable through lines $l$-1, $l$-2, $l$-4, $l$-8, the recording in M of either the information read in $m$, or that read in M.

*Reset of memory M.*—At the completion of the 12th cycle of the card, all the data punched in the card being scanned has been recorded in M. Circuits not shown in the figures permit the reading out of this data between the 12th and 1st read cycles of the next card.

All the data recorded in M must be deleted before the row of the 9's of the next card goes past the read brushes, so that all the cores in M may be reset before the recording of the next card therein.

This non-regeneration condition in memory M is due to reset breaker RM, the make time of which is given by curve RM in FIG. 3. The contacts of this breaker are open during the 80 scanning cycles corresponding to the row of the 9's in the card and closed all the rest of the time. When they are closed, positive high voltage is applied to an input terminal of logical AND circuits E1, E2, E4, E8. These circuits have 3 input terminals. The input terminal connected to the contact of breaker R$m$ then is favored during all the time, except during the 80 scanning cycles corresponding to the row of the 9's. During read time $tl$, read signals from memory M traverse amplifiers A1, A2, A4, A8, then circuits E1, E2, E4, E8, triggers B1, B2, B4, B8, the coder, and are regenerated in M. On the other hand, during the reading of the row of the 9's in the next card, circuits E1, E2, E4, E8 are no longer favored, and read signals in memory $m$ will always be applied to trigger B$m$, then to the coder. However, read signals in memory M cannot be found at the output of circuits E1, E2, E4, E8. They are no longer applied to triggers B1, B2, B4, B8, nor to the coder, and cannot be regenerated any more in M. Thus, all the data contained in the preceding card is deleted in memory M, so as to permit the recording of the data of the next card therein.

It is quite obvious that any substitution, suppression or addition effected during the achievement of this read device, and particularly any modification concerning the devices designed for storing the information to be read, the nature of the memories used, the arrangement of the memory elements, timing pulse generation, etc., would fall within the scope of the invention.

While there have been shown and described and pointed out the fundamental features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a record reading device the combination comprising means for sequentially sensing groups of like bit positions of characters coded in a first multi-element code and recorded on a recording medium, means for temporarily storing each group of bits sensed, translating means for translating from said first code to a second multi-element code, means for sequentially transferring bits from said temporary storage means to said translator, second storage means, means for transferring translated bits from said translator to said second storage means, and means for transferring bits from said second storage means to said translator whereby said translator is jointly conditioned by bits from both said first and second memories.

2. Apparatus according to claim 1 wherein said temporary storage means is a single row of magnetic cores.

3. Apparatus according to claim 2 wherein said second storage means is an array of magnetic cores.

4. Apparatus according to claim 3 wherein said temporary storage means and said second storage means are provided with common driving means.

References Cited in the file of this patent
UNITED STATES PATENTS

| | | |
|---|---|---|
| 2,702,380 | Brustman et al. | Feb. 15, 1955 |
| 2,708,267 | Weidenhammer | May 10, 1955 |

UNITED STATES PATENT OFFICE
Certificate of Correction

Patent No. 3,008,126                                              November 7, 1961

Eugeni Estrems

It is hereby certified that error appears in the above numbered patent requiring correction and that the said Letters Patent should read as corrected below.

Column 11, line 46, for "$t$–$l$" read —$t$–1—; column 13, line 14, for "this" read —these—; same column, lines 22 and 61, for "$tl$", each occurrence, read —$t$1—; column 15, line 74, and column 16, line 9, for "B$l$", each occurrence, read —B1—; column 16, line 13, for "$l$–1, $l$–2, $l$–4, $l$–8" read —1–1, 1–2, 1–4, 1–8—; line 36, for "$tl$" read —$t$1—.

Signed and sealed this 14th day of May 1963.

[SEAL]

Attest:
ERNEST W. SWIDER,
*Attesting Officer.*

DAVID L. LADD,
                                                                     *Commissioner of Patents.*